Dec. 25, 1951     H. J. ALDRICH     2,579,641

SPRING UNIT FOR STRIPPER DEVICES

Filed Oct. 14, 1947

INVENTOR
HARRY J. ALDRICH
BY
ATTORNEYS.

Patented Dec. 25, 1951

2,579,641

UNITED STATES PATENT OFFICE 2,579,641

SPRING UNIT FOR STRIPPER DEVICES

Harry J. Aldrich, Lansing, Mich., assignor to Motor Wheel Corporation, Lansing, Mich., a corporation of Michigan Application October 14, 1947, Serial No. 779,829

4 Claims. (Cl. 164—110)

This invention relates to a spring unit and more particularly to a stripper spring unit which is particularly useful in presses, such as stamping, punching and shearing presses, for stripping the work from the tools or dies.

It is old in the art to use spring stripping units with punch and shearing presses either alone for directly stripping the work from the dies or in conjunction with a stripper plate which is actuated by these spring stripping units. The spring stripping units of the prior art have had certain defects, to wit; the spring of each unit is exposed so that the spring upon breaking or failing will fly out of the punching press constituting a hazard for the punch press operator; the unit has to be turned or screwed into the die and this makes the unit difficult to assemble or disassemble from the die; also severe strain is set up between the parts of the unit when screwed in place by means of a wrench.

It is an object of this invention to produce a spring unit which overcomes the objections or disadvantages of the spring units of the prior art, which is of simple structure, strong, easily assembled and disassembled from the die, and which lends itself readily to lubrication.

A further advantage of my spring unit is that the spring element of the unit can be much stronger than the springs of the prior art thereby reducing the number of spring units required in any structure in contrast with the number of prior art spring units needed for the same structure.

My invention also contemplates a spring unit wherein the spring is enclosed within a housing so that upon failure of the spring it cannot fly out of place.

Figure 1:
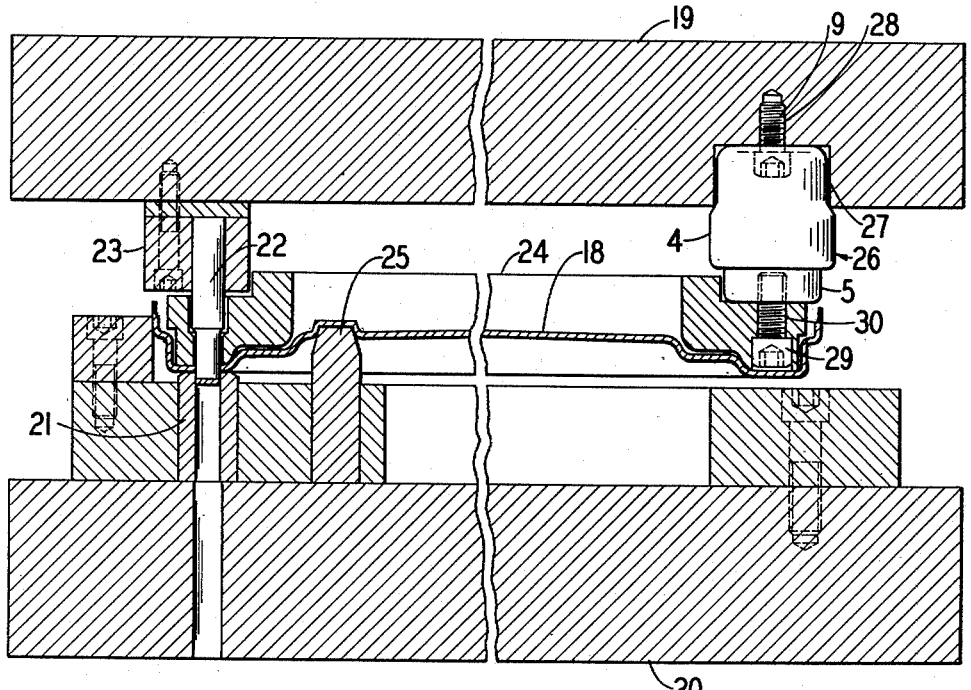
Fig. 1 is a vertical section through a die assembly for punching holes in a sheet metal part showing my spring units supporting the stripper plate.
Figure 2:
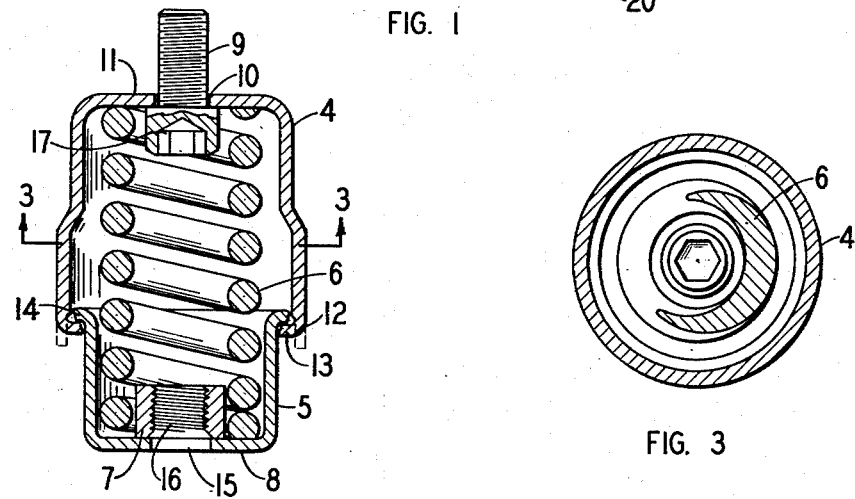
Fig. 2 is a longitudinal section through my spring unit.
Figure 3:
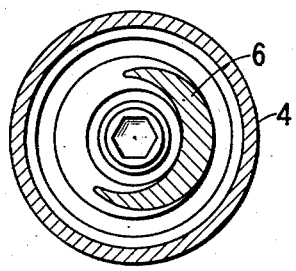
Fig. 3 is a section along the line 3—3 of Fig. 2.

My spring unit consists of five members—cup 4, cup 5 mounted in telescopic relation with respect to cup 4, spring 6, internally threaded bushing 7 welded or otherwise secured to the bottom 8 of cup 5 and cap screw 9.

The unit is assembled by first placing cap screw 9 through aperture 10 in the bottom 11 of cup 4, placing the spring 6 in cup 4 and placing cup 5 over the end of spring 6 which projects from cup 4, and then compressing spring 6 and thereby telescoping cups 4 and 5 sufficiently so that the open end 12 of cup 4 can be die formed to form a circumferential shoulder 13 which cooperates with circumferential flange 14 on cup 5 to hold cups 4 and 5 in telescoping relation and permanently connected. Cap screw 9 is fitted loosely in the aperture 10 and can be operated by means of a hexagonal shaft or Allen screw wrench inserted through opening 15 in the bottom of cup 5 and threaded opening 16 in part 7 and engaging the socket 17 in the head of cap screw 9.

In Fig. 1 I have shown a die assembly for punching holes in a sheet metal part 18. The die assembly comprises a plate 19 which is attached to the punch press head (not shown) and moves upwardly and downwardly, stationary plate 20 which supports the die 21, punch 22 which is mounted on plate 19 by tool holder 23, stripper plate 24 and locating stud 25 which positions part 18 in correct position preparatory to the punching operation.

Stripper plate 24 is mounted upon plate 19 by a plurality of stripper spring units generally designated 26 (only one of which is shown). Each unit 26 is secured in a recess 27 in plate 19 by inserting an Allen wrench through openings 15 and 16 and into socket 17 of cap screw 9 which is screwed into threaded opening 28 in plate 19. Stripper plate 24 is secured to stripper spring unit 26 by means of an Allen head cap screw 29 which is passed through an opening 30 in plate 24 and screwed into threaded opening 16 in bushing 7.

It will thus be seen that each spring unit 26 is easily assembled to, and disassembled from, plate 19 and stripper plate 24 without placing any strain upon the telescoping housing 4, 5 and spring element 6. The spring element is enclosed within the telescopic housing where it can be effectively lubricated inasmuch as the telescoping cups 4 and 5 form an excellent grease retaining structure. With my spring unit if the spring should fail, the unit does not fall apart but retains its unit structure and no parts of my spring unit can get into the die structure where they would cause damage. Further, if the spring fails, it is enclosed within the telescopic housing and cannot fly out, thus making it much safer for the press operator.

The load capacity of my spring unit is dependent upon the spring which is used. Various load capacities can be obtained by using different springs, all other parts being unchanged. In the unit illustrated in the drawings, spring 6 is preloaded to approximately 150 pounds and requires about 350 pounds pressure to compress the unit one-quarter of an inch. This has been found to be good practice for the majority of die constructions upon which this unit is used.

In Fig. 1 the die assembly is shown closed so that the pressure upon stripper plate 24 has compressed or collapsed the spring unit 26 a small distance, say, about one-quarter of an inch. As the die assembly opens, spring pressure in the spring units 26 forces stripper plate 24 against part 18 and strips this part from punch 22 to which it has a tendency to stick.

I claim:

1. A spring unit comprising a pair of telescoping cup members, a coil compression spring mounted within said cups with its ends resting upon the bottom walls of said cups, opposed holes in the bottom walls of said cups axially aligned with each other and with the coil spring, the inner cup having a circumferential outwardly projecting flange around the rim of its side wall and the outer cup having an inwardly projecting flange around the rim of its side wall interengaging beneath the flange on the other cup member, the distance between the bottom walls of said cups when their respective flanges are in abutting relation being less than the axial length of said spring whereby the spring is preloaded and an internally threaded bushing fixed within and to the bottom wall of one cup with a threaded opening aligned with the opening in the bottom wall of the said cup, and a cap screw loosely positioned in the opening in the other of said cups and with its head within said other cup and aligned with said openings in said one cup and bushing whereby said cap screw can be turned by passing an instrument through the openings in the said one cup and said bushing.

2. In combination with a die and stripper plate for a sheet metal press, a stripper spring unit for yieldably mounting the stripper plate on the die comprising a pair of telescoped cup members, a preloaded coil spring housed within said cups with the ends of said spring contacting the bottom walls of said cups, axially aligned opposed openings in the bottom walls of said cups and positioned substantially along the longitudinal axis of said coil spring, a screw passing loosely through one of said openings for threaded engagement with one of said press members, the said screw having its head within one of said cups and being adapted for turning by passing an instrument through the opposed opening in the other cup and securing means mounted in the other opening for securing the unit to the other of said press members, and means integral with said cups for retaining the cups in telescoped relation with the coil spring preloaded and for supporting the stripper plate when the press is open.

3. The combination as set forth in claim 2 wherein the said means comprises an outwardly turned flange upon the rim of the inner telescoping cup and an inwardly turned flange on the rim of the outer telescoping cup which overlies the aforementioned flange to retain the cups in telescoped relation whereby when the press is open, the cups carry the load of said stripper plate.

4. The combination as set forth in claim 3 wherein the telescoping cups are metal stampings, and an internally threaded bushing fixed to the inside face of the bottom wall of the one cup centered with the opening therein and opposite to the other opening which receives the said screw.

HARRY J. ALDRICH.

REFERENCES CITED

The following references are of record in the file of this patent:

UNITED STATES PATENTS

| Number | Name | Date |
| --- | --- | --- |
| 960,395 | Pochla et al. | June 7, 1910 |
| 1,137,145 | Krarup | Apr. 27, 1915 |
| 2,324,657 | Wales | July 20, 1943 |
| 2,334,138 | Wales | Nov. 9, 1943 |

FOREIGN PATENTS

| Number | Country | Date |
| --- | --- | --- |
| 156,863 | Great Britain | Jan. 20, 1921 |
| 223,062 | Great Britain | Oct. 16, 1924 |